United States Patent
Flynn et al.

(10) Patent No.: US 7,055,549 B2
(45) Date of Patent: Jun. 6, 2006

(54) ELECTROHYDRAULIC VALVE ASSEMBLY FOR CONTROLLING OPERATION OF ENGINE CYLINDERS

(75) Inventors: Edward A. Flynn, Pewaukee, WI (US); Curt L. VanWeelden, Sussex, WI (US); Michael C. Layne, Waterford, WI (US)

(73) Assignee: HUSCO International, Inc., Waukesha, WI (US)

( * ) Notice: Subject to any disclaimer, the term of this patent is extended or adjusted under 35 U.S.C. 154(b) by 178 days.

(21) Appl. No.: 10/753,247

(22) Filed: Jan. 8, 2004

(65) Prior Publication Data
US 2005/0150561 A1 Jul. 14, 2005

(51) Int. Cl.
*F16K 11/10* (2006.01)
(52) U.S. Cl. .................. 137/884; 123/198 F
(58) Field of Classification Search ............... 137/884; 123/198 F
See application file for complete search history.

(56) References Cited
U.S. PATENT DOCUMENTS
3,650,251 A 3/1972 Pelizzoni

| 5,887,624 | A | * | 3/1999 | Taniguchi et al. ........... 137/884 |
|---|---|---|---|---|
| 6,056,908 | A | * | 5/2000 | Petrosky et al. ........ 264/272.14 |
| 6,264,436 | B1 | | 7/2001 | Edwards et al. |
| 6,481,409 | B1 | | 11/2002 | Wade et al. |
| 6,644,265 | B1 | * | 11/2003 | Parker et al. ............. 123/198 F |
| 6,929,031 | B1 | * | 8/2005 | Ford et al. .................. 137/884 |
| 2003/0089322 | A1 | | 5/2003 | Dinkel et al. |

* cited by examiner

*Primary Examiner*—John Fox
(74) *Attorney, Agent, or Firm*—George E. Haas; Quarles & Brady LLP

(57) ABSTRACT

A hydraulic valve assembly is provided to activate and deactivate cylinder valves of a multi-cylinder engine. A plurality of electrohydraulic valves are loosely received in openings in a base plate which allows the relative positions of the valve to adjust automatically for dimensional irregularities as the assembly is installed on the engine. At the complete of that installation, elements of each electrohydraulic valve are clamped between the base plate and the engine to secure the valves in position. A flexible lead frame containing electrical conductors is secured to both the base plate and the electrohydraulic valves provides additional support while allowing movement of the valves with respect to the base plate.

22 Claims, 3 Drawing Sheets

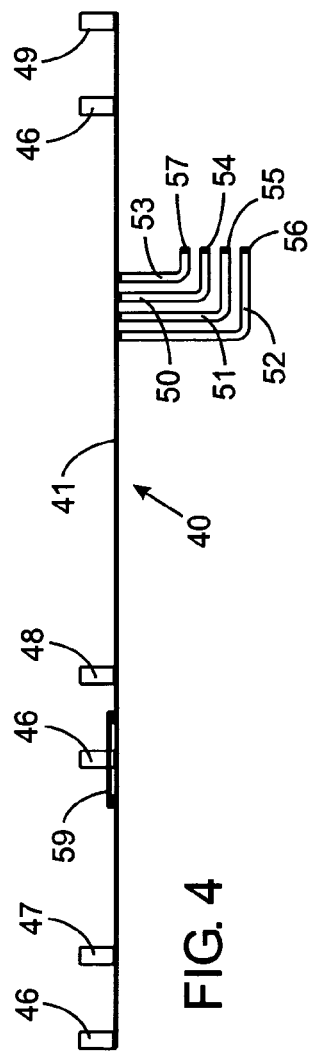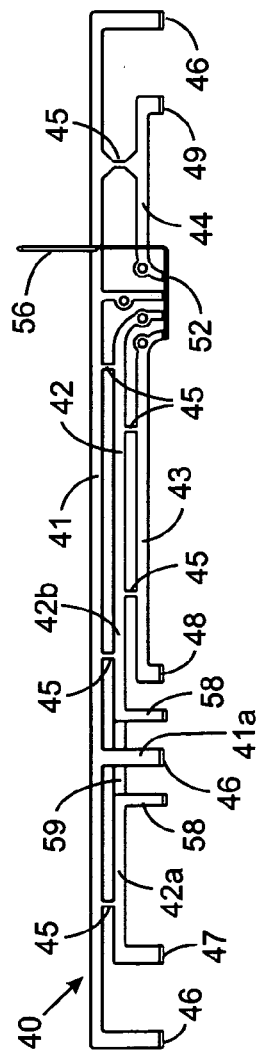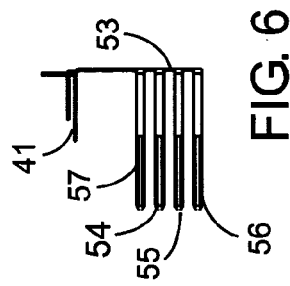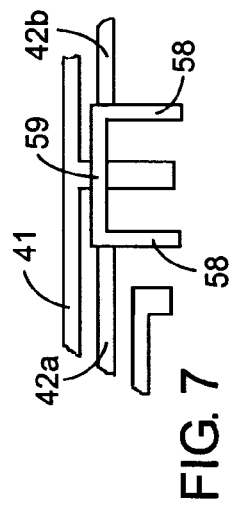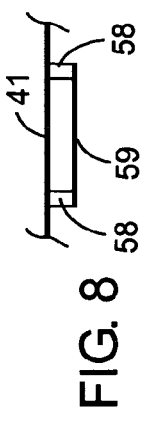

ELECTROHYDRAULIC VALVE ASSEMBLY FOR CONTROLLING OPERATION OF ENGINE CYLINDERS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to electrohydraulic valves, and more particularly to such valves that control operation of intake and exhaust valves of a multi-cylinder internal combustion engine to selectively activate and deactivate selected cylinders.

2. Description of the Related Art

In an effort to improve fuel economy, automobile manufacturers have devised systems that deactivate selected cylinders of an engine when the full power produced by all the cylinders is not required. For example, the "V-8-6-4 engine" is able to switch between four, six and eight cylinder operation. The selection of which cylinders to deactivate is determined by engine firing order with the desire to keep an even firing order in the deactivated mode. Several modes of cylinder deactivation are possible. In a bank mode, the multiple cylinders in the same bank of a V-configuration engine are switched at the same time, whereas each cylinder is switched independently in the cylinder control mode. A given cylinder is activated and deactivated by controlling the operation of the intake valves for that cylinder. By disabling the intake valve or valves for a given cylinder, the air-fuel mixture does not enter that cylinder and thus combustion does not occur. The exhaust valve also may be disabled in a similar manner.

The engine cylinder valve operation is controlled by a solenoid activated hydraulic valve which governs the flow of pressurized engine lubricating oil to a cylinder valve actuator. When the solenoid valve is energized, pressurized engine oil is applied from a workport of that valve to operate a spring-biased locking pin inside the cylinder valve lifter, which effectively decouples the cam shaft from the cylinder valve. When the solenoid is de-energized, the solenoid valve's workport is connected to the engine oil pan releasing the pressure at the cylinder valve actuator, which results in a spring biasing the locking pin to activate the intake or exhaust valve. Alternatively, the locking pin for the cylinder valve lifter can be configured so that energizing and de-energizing the solenoid valve has the opposite effects.

It is desirable to control the switching of the engine cylinder valves in less than one engine cycle. Therefore, the solenoid valve must respond very quickly in order to ensure timely deactivation and reactivation of the engine cylinder valve. Thus, it is desirable that the solenoid valve is required to generate as little force as possible thereby minimizing operating time.

When the engine is turned off, the lubricating oil that was used to control the engine cylinder valves drains into the oil pan and air enters the conduits of the valve control system. Therefore mechanism for bleeding the air from the system upon starting the engine has to be provided.

Because several solenoid activated hydraulic valves are require, it is desirable to provide a valve assembly which facilitates positioning and attaching those valves to the engine. In addition the valve assembly should be highly immune to vibrations, temperature changes and fluid exposure.

SUMMARY OF THE INVENTION

An electrohydraulic valve assembly is provided to control operation of selected cylinders of an multi-cylinder, internal combustion engine. That valve assembly includes a plurality of electrohydraulic valves for controlling flow of a fluid within the manifold. Each of the plurality of electrohydraulic valves is received in a separate opening in a base plate, wherein the openings are sized to enable the electrohydraulic valves to move in the two orthogonal axes on a surface of the base plate. A bar is coupled to the base plate and to the plurality of electrohydraulic valves, and permits movement the plurality of electrohydraulic valves with respect to the base plate. For example, the bar is cantilevered from a post that engages the base plate. The permitted movement allows the relative position of each electrohydraulic valve to adjust automatically as the assembly is mounted on an engine manifold, thereby accommodating dimensional irregularities in the various components.

Another aspect of the valve assembly is that each electrohydraulic valve comprises a member which immobilizes the electrohydraulic valve with respect to the base plate upon the base plate being fastened to the manifold. Thus while the electrohydraulic valve is mounted to the base plate in a manner that allows movement there between, the member prevents such movement when the base plate is attached to the manifold.

A further aspect of the present valve assembly is a plurality of electrical conductors attached to or embedded in the bar and connected the plurality of electrohydraulic valves. An electrical connector preferably is provided which has contacts connected to the plurality of electrical conductors to enable the valve assembly to be connected electrically to a control circuit for the engine.

BRIEF DESCRIPTION OF THE DRAWINGS

FIGS. 4, 5, and 6 are top, side and end views, respectively, of and electrical lead subassembly incorporated into the electrohydraulic valve assembly;

FIG. 7 is an enlarged side view of a section of the electrical lead subassembly;

FIG. 8 is an enlarged top view of the section of the electrical lead subassembly;

DETAILED DESCRIPTION OF THE INVENTION

Figure 1:
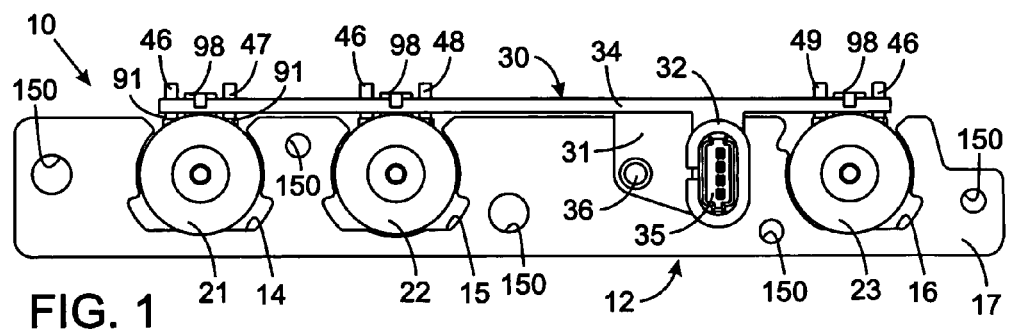
FIG. 1 is a top view of an assembly of electrohydraulic valves according to the present invention.
Figure 2:
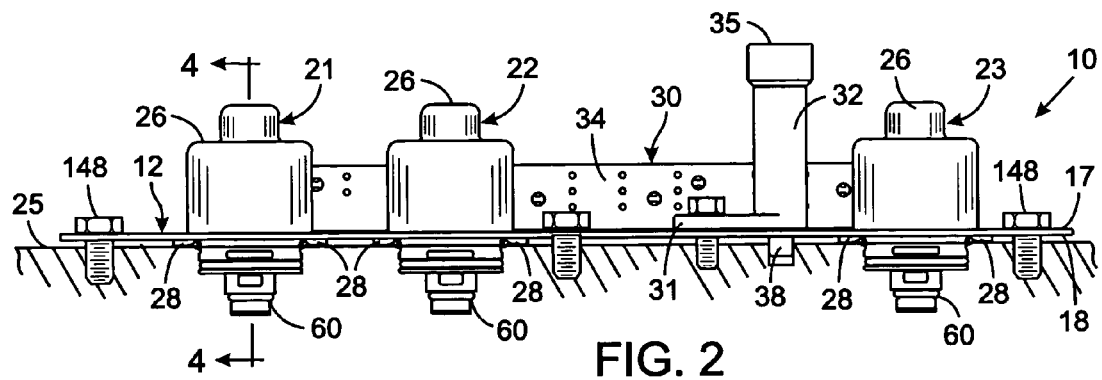
FIG. 2 is a side view of the valve assembly.
Figure 3:
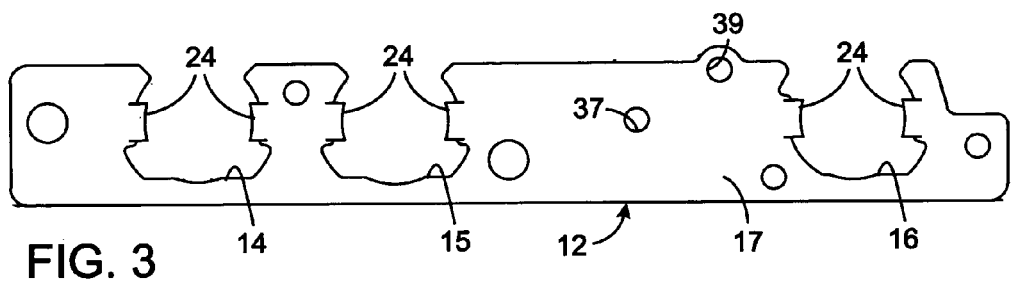
FIG. 3 is a top view of a base plate in the valve assembly.

With reference to FIGS. 1–3, a valve assembly 10 has a thin, planar base plate 12 fabricated of metal with three openings 14, 15 and 16 extending between two opposing major surfaces 17 and 18. Three electrohydraulic valves 21, 22 and 23 are located in the three openings 14, 15 and 16, respectively. The base plate 12 is dimensioned to attach to a manifold 25 of an multi-cylinder engine wherein the bodies of the three electrohydraulic valves 21–23 that extend beneath the base plate enter apertures in the manifold. Each base plate opening 14–16 is slightly larger that the outer dimension of electrohydraulic valve enabling the valve to move freely in two orthogonal axes on a major surface 17 or 18 of the base plate 12. As will be described, this loose attachment allows each electrohydraulic valve to seat itself in the respective manifold aperture and accommodate dimensional irregularities of the components when the valve assembly 10 is mounted to the engine. A pair of prongs 24 project from opposite sides toward the center of each base plate opening 14–16. The distance between the prongs 24 is slightly larger than the outer dimension of outer metal cap 26 of the electrohydraulic valve 21–23. The edge of the outer cap 26 which abuts the base plate 12 has a pair of tabs 28 which project through the opening 14, 15 or 16 and are loosely bend against the underside side of the base plate. Until the valve assembly 10 is attached to the engine, the tabs 28 do not restrict movement of the three electrohydraulic valves 21, 22 and 23 with respect to the base plate 12.

An electrical lead frame 30 has a foot 31 with a pin 38 that projects through an aperture 39 to the base plate 12 and has a mounting aperture 36 that aligns with a hole 37 in the base plate 12 (see FIG. 3) to receive a bolt as will be described. The electrical lead frame 30 has a connector post 32 projecting from the foot 31 away from the base plate 12. The lead frame 30 also has a thin, flexible bar 34 that is cantilevered from the foot 31 and connector post 32 along one longitudinal edge of the base plate 12. The flexible bar 34 is not directly connected to the base plate 12. The foot 31, connector post 32 and flexible bar 34 are fabricated from plastic that is molded around a set of electrical leads that extends from an electrical connector 35 at the end of the connector post to pairs of terminals 46–49 adjacent the electrohydraulic valves 21–23. The electrical connector 35 receives a mating connector on an end of a cable that extends from the engine computer.

The connection of the lead frame 30 to each electrohydraulic valve 21–23 prevents the valves from falling downward through the base plate 12 in FIG. 2. The outwardly projecting pair of tabs 28 prevents each electrohydraulic valve 21–23 from passing upward through the base plate 12. This holds the valve assembly 10 together prior to being attached to an engine.

With reference to FIGS. 4–6, the set of electrical leads 40 is stamped as a unit from a flat sheet of brass, although other metals may be used. The stamping is then bend into the form illustrated in the drawings. The resultant structure has four parallel, coplanar conductors 41, 42, 43 and 44, which are initially joined together by thin ties 45. The first conductor 41 is connected in common to all three electrohydraulic valves 21–23, while each of the other three conductors 42, 43 and 44 is connected to only one of the valves. Thus the first conductor 41 has three terminals 46, one adjacent each valve location (see FIG. 1). The second conductor 42 has a terminal 47 adjacent the first electrohydraulic valve 21 and a terminal 48 of the third conductor 43 is near the second electrohydraulic valve 22. The fourth conductor 44 has a terminal 49 adjacent the third electrohydraulic valve 23.

Each conductor 41, 42, 43 and 44 is joined to an end of a different L-shaped leg 50, 51, 52 or 53, respectively, which are in a plane perpendicular to the plane of the conductors. The other ends of the L-shaped legs 50, 51, 52 and 53 are connected to four contacts 54, 55, 56 and 57, respectively, which are in a plane perpendicular to the planes of the L-shaped legs and the conductors.

As seen in FIGS. 4 and 5, the second conductor 42 has a bridge 59 which crosses over an arm 41a of the first conductor 41 that extends to the terminal 46 for the second electrohydraulic valve 22. The details of this cross over are shown in the rear view this portion of the set of electrical leads 40 in FIG. 7 and also in the enlarged top view in FIG. 8. The second conductor 42 has a gap thereby segmenting the conductor into two aligned sections 42a and 42b. The arm 41a of the first conductor 41 extends through that gap (see FIG. 5). A pair of U-shaped couplings 58 each have one end extending from a different section 42a or 42b of the second conductor 42. The other ends of the couplings 58 are spaced from the plane of the conductors 41–44 and a bridge 59 extends between those other ends. In the assembled electrical lead frame 30, the plastic of the flexible bar 34 maintains the bridge 59 spaced from the conductors 41–44.

Referring again to FIGS. 1 and 2, when the plastic is molded around the set of electrical leads 40, the four parallel, conductors 41–44 are encased in the flexible bar 34, the L-shaped legs 50–53 are in the foot 31, and the four contacts 54–57 are in the connector post 32. When the mold closes, its elements hold the in the conductors 41–44 in place and sever the ties 45 between the conductors 41, 42, 43 and 44 prior to the plastic being injected into the mold.

The Electrohydraulic Valves

Figure 9:
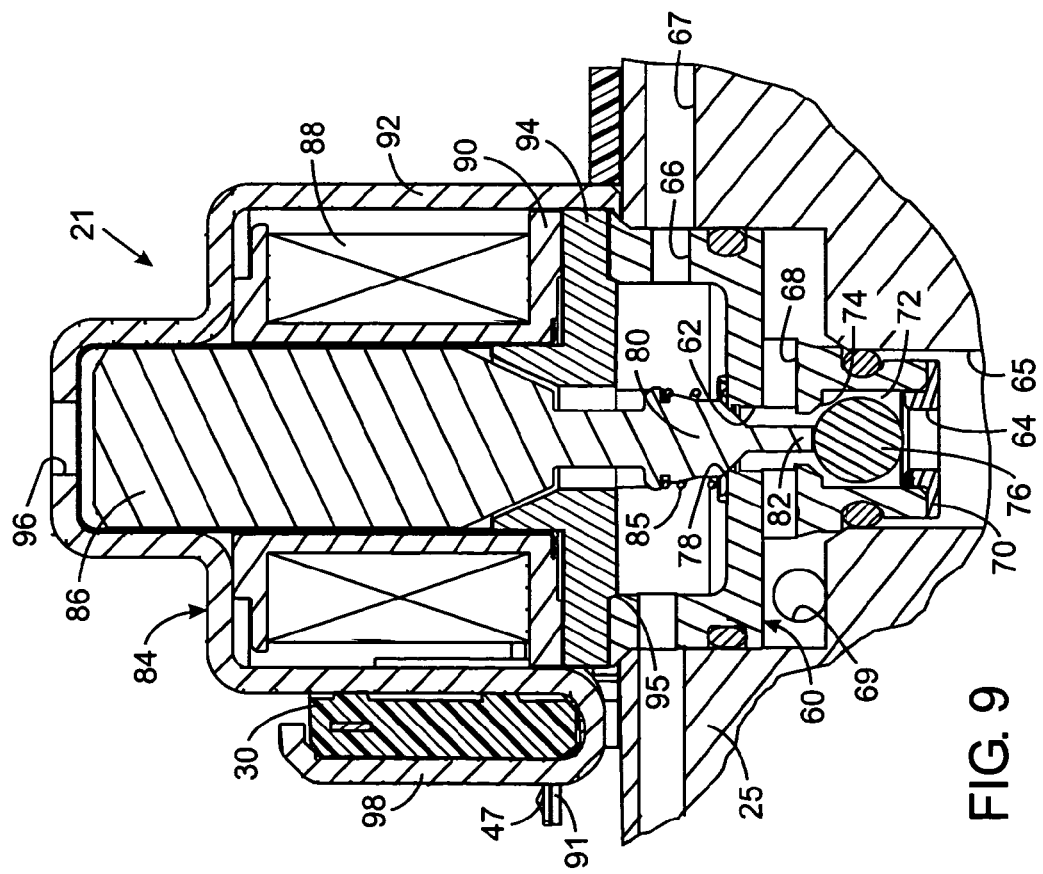
FIG. 9 is a cross section view along line 4—4 in FIG. 2 through one of the electrohydraulic valves.

The construction of the first electrohydraulic valve 21 in the assembly 10 is illustrated in FIG. 9 with the understanding that the other two valves 22 and 23 are identical to the first one. The first electrohydraulic valve 21 has valve body 60 that fits into the engine manifold 25 when the valve assembly 10 is mounted on the engine. This valve 21 has a longitudinal bore 62 extending through a valve body 60. An inlet 64 of the bore 62 at valve nose opens into a supply gallery 65 of the engine manifold through which pressurized lubricating oil flows, and a transverse outlet 66 provides a path between the bore and a return gallery 67 in the engine manifold that leads to the oil pan. Between the inlet 64 and outlet 66 along the valve body 60 is a workport 68 providing a path between the bore and a manifold gallery 69 that leads to the cylinder valve actuator. A plurality of sealing rings extend externally around the valve body 60 to engage internal walls of the engine manifold 25.

An annular plug 70 is secured in the opening of the bore 62 and forms the valve inlet 64. A first valve seat 74 is formed in the bore between the valve inlet 64 and the workport 68. A first valve element 76, in the form of a sphere, is captivated in a chamber 72 of the bore 62 located between the plug 70 and a first valve seat 74. The first valve element 76 is mechanically unbiased and able to move freely in the chamber 72 in response to fluid pressure. A second valve seat 78 is formed in the bore 62 between the workport 68 and the outlet 66.

A second valve element 80, in the form of a poppet, is slidably received within the bore 62 of the valve body 60 and selectively engages the second valve seat 78 to control fluid flow between the workport 68 and the outlet 66. A spring 85 biases the second valve element 80 away from the second valve seat 78. A stem 82 projects from the second valve element 80 toward the first valve member. The second valve element 80 is attached to and operated by an armature 86 of a solenoid actuator 84. The second valve element 80, the stem 82, and the armature 86 preferably are fabricated as a single piece.

The solenoid actuator 84 also includes an electromagnetic coil 88 wound on a bobbin 90 that has a central aperture through which the armature 86 extends. A pair of terminals 91 for the electromagnetic coil 88 extend horizontally outward (see also FIG. 1) and are resistance welded to the terminals 46 and 47 on the lead frame 30. The electromagnetic coil 88 and the bobbin 90 are contained within the metal cap 26 which has an open end closed by a magnetic pole piece 94 and the valve body 60 that is secured to the cap. The magnetic pole piece 94 has a circular rim 95 which fits into the opening of the bore 62 at the interior end of the valve body 60. This circular rim 95 aids in aligning the solenoid actuator 84 with the body 60 during assembly of the valve 21.

The cap 26 has a vent aperture 96 through which oil that leaks past the armature escapes from the cap and into the engine. Typically the valve assembly 10 is located beneath the engine valve cover so that the escaping lubricating oil is contained to flow through the engine and into the oil pan. The metal valve cap 26 has a tongue 98 which extends from one side and is bent around the lead frame 30 to secure those components together.

FIG. 9 illustrates the first electrohydraulic valve 21 in the energized state in which electric current is being applied to the electromagnetic coil 88 of the solenoid actuator 84. This creates a magnetic field that drives the armature 86 farther into the valve body 60. This movement forces the second valve element 80 against the first valve seat 78 thereby closing a fluid path between the workport 68 and the outlet 66. Motion of the armature 86 also causes the stem 82 to push the first valve element 76 away from the first valve seat 74 which opens a path between the inlet 64 and the workport 68. In this state of the first electrohydraulic valve 21, pressurized lubricating oil is applied through the workport 68 to the cylinder valve actuator and deactivates the engine cylinder valve.

When the electric current is removed from the electromagnetic coil 88, the spring 85 and hydraulic pressure forces the second valve element 80 away from engagement with the second valve seat 78. As a result a fluid path is opened between the workport 68 and the outlet 66. This motion also moves the stem 82 away from the first valve element 76 which allows the pressure at the inlet 64 to move the first valve element into engagement with the first valve seat 74 thus closing the path between the inlet 64 and the workport 68. This position of the first electrohydraulic valve 21 releases the pressure previously applied to the cylinder valve actuator and activates the associated engine cylinder.

When the engine is turned off, the first electrohydraulic valve 21 is de-energized. The force of the spring 85 moves the second valve element 80 away from the second valve seat 78 and the stem 82 away from the first valve element 76 thereby releasing any fluid pressure at the workport 68. Initially pressure at the valve inlet 64 holds the first valve element 76 against the first valve seat 74. Eventually the inlet pressure decreases to the atmospheric pressure level. When that pressure equalization occurs the first valve element 76 drops away from the first valve seat 74 due to gravity and lubricating oil in the passages of the engine drains into the oil pan. This introduces air into the first electrohydraulic valve 21 and the galleries of the engine manifold.

When the engine is restarted, the air within the manifold supply gallery is forced to the valve inlet 64 by lubricating oil from the now operating oil pump of the engine. Initially all the engine cylinders are active wherein the first electrohydraulic valve 21 is de-energized so that the second valve element 80 is away from the second valve seat 78 and the stem 82 is disengaged from the first valve element 76. However, the relative low viscosity of the air flowing through the inlet 64 is insufficient to produce a great enough pressure differential to move the spherical first valve element 76 fully upward against the first valve seat 74. As a result, the air bleeds from the inlet 64 through the second valve seat 78 and into the outlet 66 from which the air flows to a chamber underneath the engine valve cover. Some lubricating oil flows past the first valve seat 74 and displaces air in the gallery connected to the workport 68. Eventually all the air from the supply gallery is forced through the inlet 64 and the more viscous lubricating oil creates a significantly great pressure differential which applies sufficient force to move the first valve element 76 against the first valve seat 74. Thus air is automatically bled from the hydraulic system. Therefore, the present electrohydraulic valve incorporates a mechanism that automatically bleeds air from the hydraulic system for activating and deactivating the engine cylinders.

Figure 10:
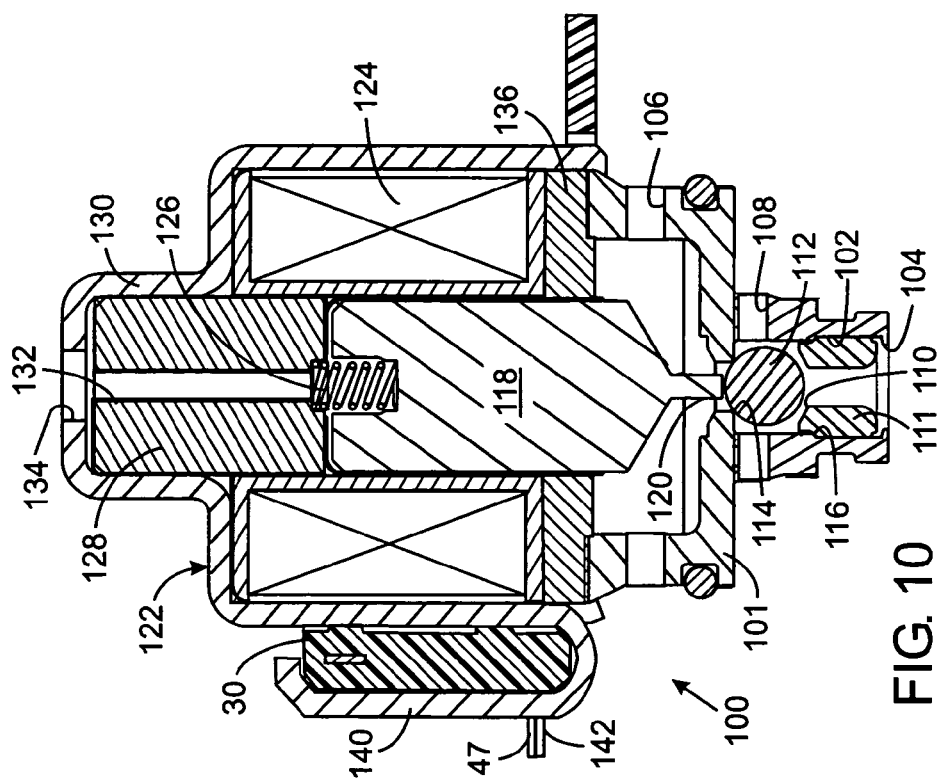
FIG. 10 is a cross section view through another embodiment of an electrohydraulic valve.

FIG. 10 illustrates a second embodiment of an electrohydraulic valve 100 according to the present invention and which has valve body 101 with a longitudinal bore 102 extending there through. The valve body 101 has an inlet 104 at an exposed end of the bore 102, a transverse outlet 106, and a transverse workport 108 between the inlet and outlet. A first valve seat 110 is formed on a tubular member 111 that is slidably received within the bore between the valve inlet 104 and the workport 108. A second valve seat 114 is formed in the bore 102 between the workport 108 and the outlet 106. A spherical valve element 112 is captivated in the bore 102 and selectively engages the first and second valve seats 110 and 114 one at a time.

The spherical valve element 112 is operated on by a stem 120 that projects from an armature 118 that is part of the solenoid actuator 122. The armature 118 is biased into engagement with the spherical valve element 112 by a spring 126 and is driven away from the spherical valve element by the magnetic field produced by an electromagnetic coil 124. The first magnetic pole piece 128 is fixedly secured within a metal cap 130 of the solenoid actuator 122 extending into the electromagnetic coil 124. Both the first magnetic pole piece 128 and the cap 130 have apertures 132 and 134 to allow oil that leaks past the armature 118 to escape from the valve 100. The metal cap 130 has an open end that is closed by a second annular magnetic pole piece 136 and the valve body 101 to which the cap is secured.

The metal cap 130 of the solenoid actuator 122 has a tongue 140 which extends from one side and is bent around the lead frame 30. Electrical terminals 142 of the electromagnetic coil 124 are resistance welded to terminals of the lead frame 30 thereby electrically connecting the valve 100 to the engine computer.

In the de-energized state of the electrohydraulic valve 100, the force of the spring 126 is greater than the force exerted by pressure at the inlet 102. Therefore, the armature 118 is moved downward in the drawings wherein the stem 120 pushes the spherical valve element 112 against the first valve seat 110 which in turn slides the tubular member 111 against stops at the inlet 104. In this state, the spherical valve element 112 abutting the first valve seat 110 effectively blocks flow of oil from the inlet 104. However, oil is able to flow from the workport 108 past the stem 120 and armature 118 to the outlet 106. Therefore, pressure is relieved at the workport 108, thereby causing the cylinder valve actuator to activate the engine cylinder.

When the engine is turned off, the pressure in the hydraulic system equalizes at the atmospheric pressure level. When this occurs, gravity causes the tubular member 111 and the spherical valve element 112 to drop against stops at the inlet 104. When the engine is restarted, air in the valve hydraulic system flows into the valve inlet 104 and through small gap between the outer surface of the tubular member 111 and the bore 102. This air flow continues to the valve outlet 106 from which it is exhausted from the system. The relatively low viscosity of the air does not create a great enough pressure differential to apply significant force to move the tubular member 111 away from the inlet 104. When lubricating oil, which has a greater viscosity than air, reaches the inlet 104, the tubular member 111 is forced upward against a lip 116 in the bore 102 which seals the gap between the tubular member and the bore. The force of the pressurized oil, that now is applied to the surface area of the spherical valve element 112 exposed in the central opening through the tubular member 111, is insufficient to counteract the spring force and unseat the valve element from the first valve seat 110.

When the electrohydraulic valve 100 is energized, the magnetic field produced by the electromagnetic coil 124 draws the armature upward against the force of spring 126. This action moves the stem 120 away from the spherical valve element 112, which then is forced by the inlet oil pressure away from the first valve seat 110 and against the second valve seat 114. In this state, pressurized lubricating oil flows from the inlet 104 through the workport 108 to deactivate the engine cylinder valve. The spherical valve element 112 abutting the second valve seat 114 prevents oil from flowing to the outlet 106.

Fabricating of the Valve Assembly

Prior to mounting each electrohydraulic valve 21–23 on the base plate 12, the tongue 98 of the metal valve cap 26 has an large upper opening. The valve assembly 10 is constructed by inserting the three electrohydraulic valves 21–23 upward into the respective openings 14–16 in the base plate 12 until the tabs 28 abut the underside of the base plate. The relatively large size of the openings 14–16 able the valves 21–23 to move along the two orthogonal axes of the plane of the base plate 12.

Next the flexible bar 34 of the electrical lead frame 30 is inserted between the main part of each valve's cap 26 and the tongue 98. As this occurs the pin 38 on the lead frame foot 31 passes into the aperture 39 in the base plate 12. The tips of the tongues 98 then are bend over the upper edge of the flexible bar 34 to secure the three electrohydraulic valves 21–23 to the electrical lead frame 30. At this point the electrohydraulic valves 21–23 are captivated in the assembly by the connection to the lead frame 30 and the outwardly projecting valve tabs 28, thereby holding the valve assembly 10 together prior to being attached to an engine.

When the valve assembly is mounted on the engine manifold 25, the bodies 60 of the three electrohydraulic valves 21–23 are inserted into separate openings in the manifold. The pin 38 on the lead frame connector post 32 that projects through the base plate 12 enters a locating aperture in the manifold to position the base plate. Bolts 148 are placed through apertures 150 in the base plate 12 and into threaded holes in the manifold 25. As the bolts 148 are tightened, the electrohydraulic valves are pushed farther into the manifold openings. The loose engagement of the valves with the base plate 12 allows each valve to move with respect to the base plate and properly seat in the respective opening. The cantilevered bar 34 of the lead frame 30 flexes to allow each valve 21–23 to move in an arc with respect to the connector post 32 and thereby adjust the valve's position for dimensional irregularities between the valve openings and the bolt holes in the manifold. When the bolts are fully tightened, the tabs 28 on electrohydraulic valves 21–23 are clamped between the base plate 12 and the manifold 25 preventing further movement of the valves, which thereby are secured in place.

Furthermore, vibration produced by engine operation is absorbed by the lead frame 30 flexing along is length and is not concentrated at the electrical connections between the valves and the lead frame. This distribution of the vibrational motion significantly reduces fatigue which otherwise would occur at these joints.

The foregoing description was primarily directed to a preferred embodiments of the present invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. An electrohydraulic valve assembly for controlling operation of cylinder valves of a multi-cylinder engine having a manifold, the assembly comprising:
   a plurality of electrohydraulic valves for controlling flow of a fluid within the manifold;
   a base plate having a plurality of openings in one planar surface and within each of which one of the plurality of electrohydraulic valves is received abutting the one planar surface and, wherein the openings are sized to enable the plurality of electrohydraulic valves to move along two orthogonal axes while in the openings; and
   a bar attached to the base plate and the plurality of electrohydraulic valves, wherein the bar so attached permits movement between the base plate and the plurality of electrohydraulic valves along the two orthogonal axes.

2. The electrohydraulic valve assembly as recited in claim 1 further comprising a fastener for securing the base plate to the manifold; and wherein each of the plurality of electrohydraulic valves comprises a member which immobilizes the respective electrohydraulic valve with respect to the base plate upon the fastener securing the base plate to the manifold.

3. The electrohydraulic valve assembly as recited in claim 1 further comprising a post secured to the base plate and from which the bar is cantilevered and the post having a pin which extends through a hole in the base plate for engaging an aperture in the manifold to locate the assembly on the manifold.

4. The electrohydraulic valve assembly as recited in claim 3 further comprising a plurality of electrical conductors attached to the bar, wherein the plurality of electrical conductors are connected the plurality of electrohydraulic valves.

5. The electrohydraulic valve assembly as recited in claim 4 wherein the post comprises an electrical connector having contacts connected to the plurality of electrical conductors.

6. The electrohydraulic valve assembly as recited in claim 5 wherein the plurality of electrical conductors comprises a first conductor and a second conductor coplanar with the first conductor, the second conductor having first and second sections with a gap there between, the first conductor having an arm extending through the gap, the plurality of electrical conductors further comprising a bridge extending between the first and second sections and over the arm.

7. The electrohydraulic valve assembly as recited in claim 6 wherein the bridge is connected to one end of a first U-shaped coupling which has another end connected to the first section, and the bridge is connected to a first end of a second U-shaped coupling which has second end connected to the second section.

8. The electrohydraulic valve assembly as recited in claim 1 wherein each of the plurality of electrohydraulic valves comprises a tab; and further comprising a fastener for securing the base plate to the manifold wherein the tab of each of the plurality of electrohydraulic valves is clamped against the one planar surface and the manifold.

9. The electrohydraulic valve assembly as recited in claim 1 wherein the bar comprises a only one attachment member engaging the base plate and from which the bar is cantilevered is a manner to be capable of flexing parallel to the one planar surface.

10. The electrohydraulic valve assembly as recited in claim 9 wherein the one attachment member comprises a pin which extends through a hole in the base plate for engaging an aperture in the manifold to locate the assembly on the manifold.

11. An electrohydraulic valve assembly for controlling operation of cylinder valves of a multi-cylinder engine having a manifold, the assembly comprising:
  a plurality of electrohydraulic valves to control flow of a fluid within the manifold;
  a base plate having a first planar surface and a second planar surface with a plurality of openings there between, one of the plurality of electrohydraulic valves being received in each opening and abutting the first planar surface, wherein each opening is sized to enable the electrohydraulic valve received therein to move along two orthogonal axes on the first planar surface of the base plate; and
  a lead frame having only one post attached to the base plate and a bar projecting from the post and secured to each of the plurality of electrohydraulic valves, wherein the bar is flexible and able to bend with respect to the post thereby enabling movement of the plurality of electrohydraulic valves with respect to the base plate.

12. The electrohydraulic valve assembly as recited in claim 11 further comprising:
  a plurality of electrical conductors extending through the lead frame and being connected the plurality of electrohydraulic valves; and
  an electrical connector attached to the post having contacts connected to the plurality of electrical conductors.

13. The electrohydraulic valve assembly as recited in claim 12 wherein plurality of electrical conductors comprise a first conductor and a second conductor coplanar with the first conductor, the second conductor having first and second sections with a gap there between, the first conductor having an arm extending through the gap, the plurality of electrical conductors further comprising a bridge extending between the first and second sections and over the arm.

14. The electrohydraulic valve assembly as recited in claim 13 wherein the bridge is connected to one end of a first U-shaped coupling which has another end connected to the first section, and the bridge is connected to a first end of a second U-shaped coupling which has second end connected to the second section.

15. The electrohydraulic valve assembly as recited in claim 11 wherein the post comprises a pin which extends through a hole in the base plate for engaging an aperture in the manifold to locate the assembly on the manifold.

16. The electrohydraulic valve assembly as recited in claim 11 further comprising a fastener for securing the base plate to the manifold; and wherein each of the plurality of electrohydraulic valves comprises a member which immobilizes the respective electrohydraulic valve with respect to the base plate upon the fastener securing the base plate to the manifold.

17. The electrohydraulic valve assembly as recited in claim 11 further comprising a fastener for securing the base plate to the manifold; and wherein each of the plurality of electrohydraulic valves comprises a tab which is clamped between the first planar surface of the base plate and the manifold when the fastener secures the base plate to the manifold.

18. An electrohydraulic valve assembly for controlling operation of cylinder valves of a multi-cylinder engine having a manifold, the assembly comprising:
  a plurality of electrohydraulic valves for controlling flow of a fluid within the manifold;
  a base plate having two major surfaces with a plurality of openings there between, one of the plurality of electrohydraulic valves being received in each opening and abutting one of the major surfaces, wherein each electrohydraulic valve so received is able to move along two orthogonal axes on the one major surface of the base plate; ands
  lead frame having only one post attached to and projecting orthogonally from the base plate, and a bar that is cantilevered from the single post and secured to each of the plurality of electrohydraulic valves, wherein the bar is flexible and enables movement of the plurality of electrohydraulic valves with respect to the base plate, a plurality of electrical conductors extending through the lead frame and being connected the plurality of electrohydraulic valves, and an electrical connector attached to the post having contacts connected to the plurality of electrical conductors.

19. The electrohydraulic valve assembly as recited in claim 18 wherein plurality of electrical conductors comprise a first conductor and a second conductor coplanar with the first conductor, the second conductor having first and second sections with a gap there between, the first conductor having an arm extending through the gap, the plurality of electrical conductors further comprising a bridge extending between the first and second sections and over the arm.

20. The electrohydraulic valve assembly as recited in claim 19 wherein the bridge is connected to one end of a first U-shaped coupling which has another end connected to the first section, and the bridge is connected to a first end of a second U-shaped coupling which has second end connected to the second section.

21. The electrohydraulic valve assembly as recited in claim 18 further comprising a fastener for securing the base plate to the manifold; and wherein each of the plurality of electrohydraulic valves comprises a member which immobilizes the respective electrohydraulic valve with respect to the base plate upon the fastener securing the base plate to the manifold.

22. The electrohydraulic valve assembly as recited in claim 18 further comprising a fastener for securing the base plate to the manifold; and wherein each of the plurality of electrohydraulic valves comprises a tab which is clamped against the base plate and the manifold when the fastener secures the base plate to the manifold.

* * * * *